US008249423B2

(12) United States Patent
Ekstrand

(10) Patent No.: US 8,249,423 B2
(45) Date of Patent: Aug. 21, 2012

(54) ELECTRONIC DEVICES AND METHODS THAT INSERT ADDRESSABLE CHAPTER MARKS RELATIVE TO ADVERTISING CONTENT IN VIDEO STREAMS

(75) Inventor: Simon Ekstrand, Eslöv (SE)

(73) Assignee: Sony Ericsson Mobile Communications AB, Lund (SE)

( * ) Notice: Subject to any disclaimer, the term of this patent is extended or adjusted under 35 U.S.C. 154(b) by 894 days.

(21) Appl. No.: 12/117,321

(22) Filed: May 8, 2008

(65) Prior Publication Data

US 2009/0282454 A1 Nov. 12, 2009

(51) Int. Cl.
  *H04N 9/80* (2006.01)
(52) U.S. Cl. ........ 386/249; 386/241; 386/250; 386/251; 386/287; 386/288
(58) Field of Classification Search .................. 386/241, 386/249–251, 286–288
  See application file for complete search history.

(56) References Cited

U.S. PATENT DOCUMENTS

| | | | |
|---|---|---|---|
| 6,222,532 B1 | 4/2001 | Ceccarelli | |
| 6,711,741 B2 * | 3/2004 | Yeo | 725/87 |
| 7,272,295 B1 * | 9/2007 | Christopher | 386/251 |
| 7,401,351 B2 * | 7/2008 | Boreczky et al. | 725/88 |
| 7,734,579 B2 * | 6/2010 | White et al. | 707/609 |
| 8,019,195 B2 * | 9/2011 | Shiiyama | 386/241 |
| 2003/0122966 A1 | 7/2003 | Markman et al. | |
| 2004/0021794 A1 * | 2/2004 | Nakayama et al. | 348/468 |
| 2004/0210896 A1 * | 10/2004 | Chou et al. | 717/174 |
| 2004/0221311 A1 * | 11/2004 | Dow et al. | 725/52 |
| 2004/0228616 A1 * | 11/2004 | Miyasato et al. | 386/83 |
| 2004/0268398 A1 * | 12/2004 | Fano et al. | 725/88 |
| 2005/0125828 A1 * | 6/2005 | Fujiwara et al. | 725/60 |
| 2005/0262539 A1 * | 11/2005 | Barton et al. | 725/90 |
| 2005/0283793 A1 * | 12/2005 | Chiu | 725/19 |
| 2006/0248569 A1 * | 11/2006 | Lienhart et al. | 725/135 |
| 2006/0263045 A1 | 11/2006 | Horiguchi | |

(Continued)

FOREIGN PATENT DOCUMENTS

GB  2 423 882 A  9/2006

(Continued)

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/IB2008/054688, Mar. 23, 2009.

*Primary Examiner* — Jeffrey Pwu
*Assistant Examiner* — Jayesh Jhaveri
(74) *Attorney, Agent, or Firm* — Myers Bigel Sibley & Sajovec, P.A.

(57) ABSTRACT

Various embodiments provide an electronic device that includes video storage memory, a video signal receiver, and a video storage controller. The video signal receiver is configured to receive a video stream containing advertising content and program/movie content from a broadcast source. The video storage controller is configured to identify locations of advertising content interspersed among program/movie content in the received video stream, and to record addressable chapter marks for the identified locations of the advertising content and a video stream that is based on the received video stream into the memory. The addressable chapter marks may be displayed on a display and used by a viewer to jump playback of the video stream between the chapter marks.

20 Claims, 4 Drawing Sheets

U.S. PATENT DOCUMENTS

| | | |
|---|---|---|
| 2007/0031118 A1 | 2/2007 | Fujishima et al. |
| 2007/0083883 A1* | 4/2007 | Deng ............................ 725/19 |
| 2007/0206923 A1 | 9/2007 | Murakoshi et al. |
| 2007/0253678 A1* | 11/2007 | Sarukkai ........................ 386/95 |
| 2008/0016089 A1 | 1/2008 | Nishiyama |
| 2008/0266460 A1* | 10/2008 | Hirosawa ..................... 348/700 |
| 2009/0009661 A1* | 1/2009 | Murakami et al. ........... 348/468 |
| 2009/0222853 A1* | 9/2009 | White et al. .................... 725/34 |
| 2009/0288112 A1* | 11/2009 | Kandekar et al. .............. 725/32 |
| 2010/0325657 A1* | 12/2010 | Sellers et al. .................. 725/32 |

FOREIGN PATENT DOCUMENTS

| | | |
|---|---|---|
| WO | WO 02/084598 A1 | 10/2002 |

* cited by examiner

ELECTRONIC DEVICES AND METHODS THAT INSERT ADDRESSABLE CHAPTER MARKS RELATIVE TO ADVERTISING CONTENT IN VIDEO STREAMS

BACKGROUND OF THE INVENTION

The present invention relates to the field of broadcast video in general and, more particularly, to viewing broadcast programs and movie videos on wireless communication terminals and other electronic devices.

A wide variety of forms of delivery of video from broadcasted programs and movies have emerged. For example, it is now commonplace for televised programs and movies to be available from over-the-air terrestrial and satellite television service providers and Internet-based television providers. Programs and movies including, without limitation, televised shows, theatrical movies, news, music, and other content may be simultaneously broadcast over a wide geographic region and/or may be broadcast on-demand to a particular receiver. Many electronic devices are available that record received programs and movies for later playback for viewing.

Wireless mobile terminals, such as cellular phones, are increasingly being provided with capabilities to receive broadcast programs and movies from broadcast transmitters, such as via a digital television receiver, and/or as a downloadable video stream via high-bandwidth wireless transceivers and network servers. Some wireless mobile terminals may also be available that can record at least a portion of received program/movie video.

Although advancements in mobile terminal features and communications technologies are providing far more users the capability to obtain broadcast programs and movies through their mobile terminals, these capabilities may continue to be slowly adopted due to, for example, frustration users can experience from poor navigational aids to locations within recorded video and frequent interruptions from advertising content that is interspersed between program/movie content in the recorded video.

SUMMARY OF EMBODIMENTS OF THE INVENTION

Various embodiments of the present invention provide an electronic device that includes video storage memory, a video signal receiver, and a video storage controller. The video signal receiver is configured to receive a video stream containing advertising content and program/movie content from a broadcast source. The video storage controller is configured to identify locations of advertising content interspersed among program/movie content in the received video stream, and to record addressable chapter marks for the identified locations of the advertising content and a video stream that is based on the received video stream into the memory. The addressable chapter marks may be displayed on a display and used by a viewer to jump playback of the video stream between the chapter marks.

In some further embodiments, the video storage controller is further configured to insert the addressable chapter marks within an address look-up table that is recorded within a same memory file that contains the video stream.

In some further embodiments, the video storage controller is further configured to remove and replace each instance of the advertising content of the received video stream with a corresponding one of the addressable chapter marks to generate a modified video stream that is recorded into the memory.

In some further embodiments, the video storage controller is further configured to extract subtitle text that is embedded in the program/movie content portion of the received video stream and located within a defined play time relative to each of the identified locations of advertising content, and to insert the extracted subtitle text as part of the addressable chapter marks that are recorded with the video stream into the memory.

In some further embodiments, the video storage controller is further configured to begin displaying on a display the extracted subtitle text for a next occurring addressable chapter mark during playback of the video stream before the playback reaches that next occurring addressable chapter mark.

In some further embodiments, the video storage controller is further configured to capture a snapshot of a video frame of the program/movie content portion of the video stream following each of the identified locations of the advertising content, and to insert the captured snapshots as part of the addressable chapter marks that are recorded with the video stream into the memory.

In some further embodiments, the video storage controller is further configured to begin displaying on a display the captured snapshot for a next occurring addressable chapter mark during playback of the video stream before the playback reaches that next occurring addressable chapter mark.

In some further embodiments, the video storage controller is further configured to playback the video stream, which was recorded into the memory, onto a video display, to display on the display a playback timeline that indicates a playback length of the video stream and includes an indicia that indicates a present playback location within the playback timeline, and to display on the playback timeline at least a plurality of the addressable chapter marks having spacing therebetween that is proportional to their relative locations within the playback timeline of the video stream.

In some further embodiments, the video storage controller is further configured to respond to a viewer chapter selection signal by jumping a playback location within the video stream to locations defined by selected ones of the addressable chapter marks.

In some further embodiments, the video storage controller is further configured to respond to each occurrence of the viewer chapter selection signal by jumping the playback location to a different one of sequentially occurring time locations in the video stream defined by sequential ordered ones of the addressable chapter marks.

In some further embodiments, the video storage controller is further configured to extract subtitle text that is embedded in the program/movie content portion of the video stream recorded in the memory and located within a defined play time relative to a next playback occurring one of the displayed addressable chapter marks, and to begin displaying the extracted subtitle text before playback reaches that next occurring displayed addressable chapter mark.

In some further embodiments, the subtitle text comprises closed captioned text that is embedded in the program/movie content portion of the video stream recorded in the memory, and the video storage controller is further configured to extract and display on the video display a defined number of words of the closed captioned text that occur prior to the next playback occurring one of the displayed addressable chapter marks.

In some further embodiments, the video storage controller is further configured to extract subtitle text that is embedded in the program/movie content portion of the video stream recorded in the memory and located within a defined play time relative to a plurality of the displayed addressable chapter marks, and to display on the display the extracted subtitle text for the plurality of the displayed addressable chapter marks.

In some further embodiments, the video storage controller is further configured to display the extracted subtitle text associated with a plurality of the displayed addressable chapter marks ordered on the display adjacent to those displayed addressable chapter marks.

In some further embodiments, the extracted subtitle text comprises closed captioned text that is embedded in the video stream recorded in the memory, and the video storage controller is further configured to extract and display on the video display a defined number of words of the closed captioned text that occur following a plurality of the displayed addressable chapter marks.

In some further embodiments, the video storage controller is further configured to capture a snapshot of a video frame of the program/movie content portion of the video stream following a next playback occurring one of the displayed addressable chapter marks, and to begin displaying the captured snapshot before playback reaches that next occurring displayed addressable chapter mark.

In some further embodiments, the video storage controller is further configured to capture a snapshot of a video frame of the program/movie content portion of the video stream following each of the displayed addressable chapter marks, and to display on the video display the captured snapshots for the plurality of the displayed addressable chapter marks.

In some further embodiments, the video storage controller is further configured to identify the location of each instance of the advertising content in the received video stream in response a threshold amount of change of scene content occurring between two sequential frames of the video stream during a time window defined around an expected time of occurrence of each instance of the advertising content.

In some further embodiments, the video storage controller is further configured to identifying the location of a first instance of the advertising content and to then determine a start location of a subsequent time window, which it will use to search for a second instance of the advertising content, as a defined time interval away from the identified location of the first instance of the advertising content.

In some further embodiments, the video storage controller is further configured to generate a message including an identifier for the video stream and the associated addressable chapter marks, and to transmit the message through an external network to another electronic device for use in displaying the video stream with the addressable chapter marks.

Other apparatus, systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1:
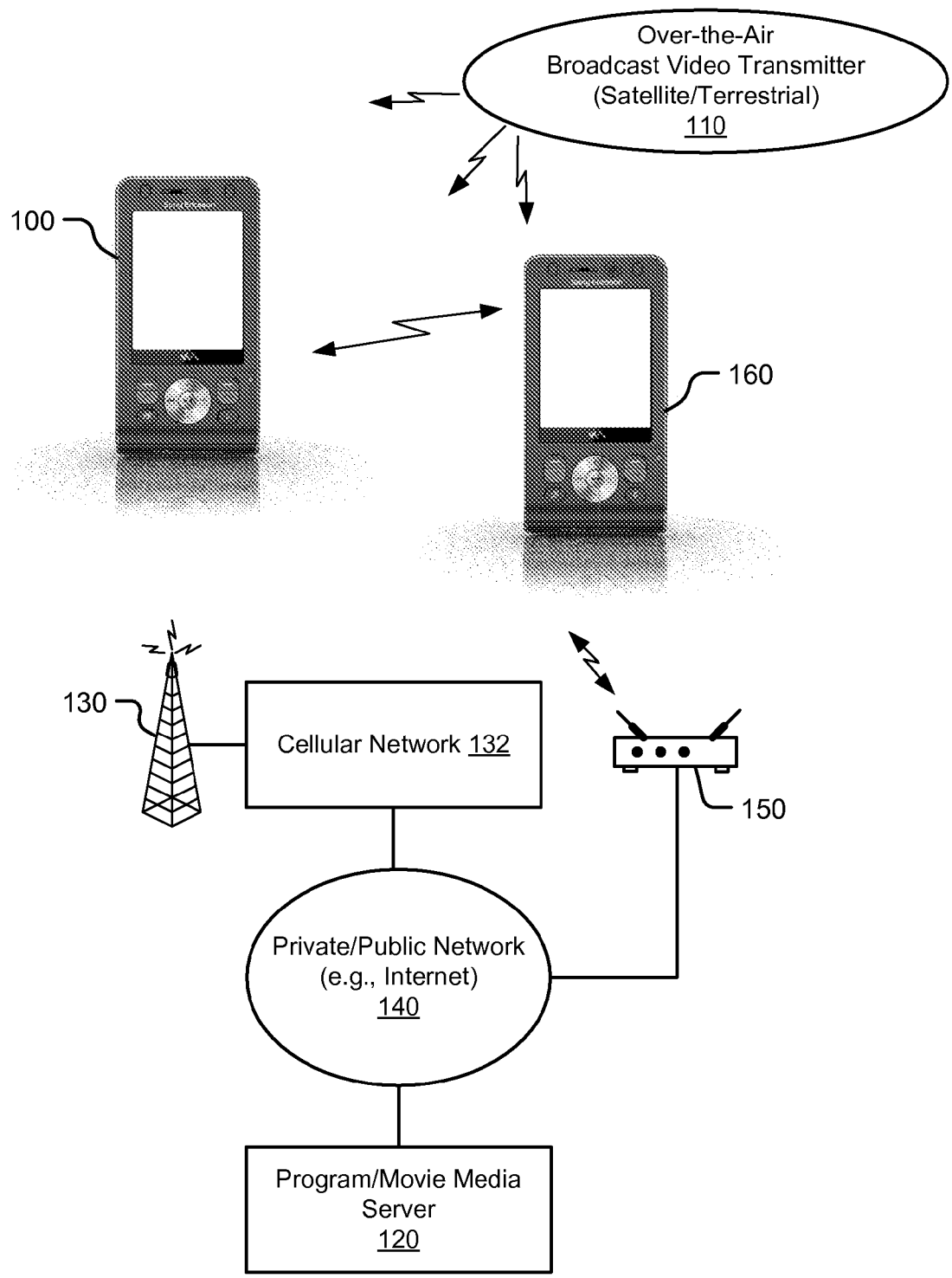
FIG. 1 is a system diagram that illustrates a wireless mobile communication terminal that can receive broadcast programs/movies from over-the-air broadcasters and/or from a program/movie server in accordance with some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Most television programs and many movies are written and filmed so as to facilitate the insertion of advertisement breaks, because advertisements have become a requirement by many broadcasters. In order to keep viewers interested in the program/movie and to facilitate the perceived continuity of the program/movie following an advertisement, the programs/movies are often written with story lines that culminate before each anticipated advertisement break, and which start up new following each anticipated advertisement break. A natural breaking point in the story is therefore generally formed at the advertisement breaks.

Various embodiments of the present invention may arise from a realization that advertisement breaks can correspond to locations where a viewer may want to be able to directly and easily access and step between during viewing of a program/movie. Accordingly, various embodiments of the present invention are directed to enabling a person who is watching a recorded program/movie to jump a playback location along a timeline that includes chapter marks which have been created based on the locations of advertising content which has been identified within the recorded program/movie.

Although various embodiments of the present invention are described in the context of wireless mobile terminals, the invention is not limited thereto. Instead, the invention may be applied to any electronic device that is configured to receive, record, and playback video streams containing advertising content and program/movie content.

As used herein, a "wireless mobile terminal" or, abbreviated, "terminal" includes, but is not limited to, any electronic device that is configured to transmit/receive communication signals via a long range wireless interface such as, for example, a cellular interface, via a short range wireless interface such as, for example, a Bluetooth wireless interface, a wireless local area network (WLAN) interface such as IEEE 801.11a-g, and/or via another radio frequency (RF) interface. Example terminals include, but are not limited to, cellular phones, PDAs, and mobile computers that are configured to communicate with other communication devices via a cellular communication network, a Bluetooth communication network, WLAN communication network, and/or another RF communication network.

FIG. 1 is a system diagram that illustrates a wireless mobile communication terminal 100 that can receive a broadcast program/movie video stream from an over-the-air broadcaster via a satellite/terrestrial transmitter 110 and/or from a program/movie media server 120 in accordance with some embodiments of the present invention. The video stream may be broadcast across a geographic area (e.g., satellite/over-the-air/cable service area) and/or broadcast on-demand to a particular subscriber.

The terminal 100 can connect and download a video stream from the media server 120 through a cellular base station transceiver 130, a cellular network 132, and a private/public network (e.g., Internet) 140. Alternatively or additionally, the terminal 100 can download the video stream through a WLAN router/Bluetooth communication 150. The media server 120 may download the program/movie stream requested by the terminal 100 to the terminal 100 as a data file, and/or it may stream the program/movie stream to the terminal 100 using, for example, the Real Time Streaming Protocol (RTSP) IETF RFC 2326 and/or RFC 3550.

The terminal 100 may also communicate with another terminal 160 through the cellular transceiver 130 and/or through a short range wireless communication network, such as the WLAN 150 and/or a Bluetooth network.

Figure 2:
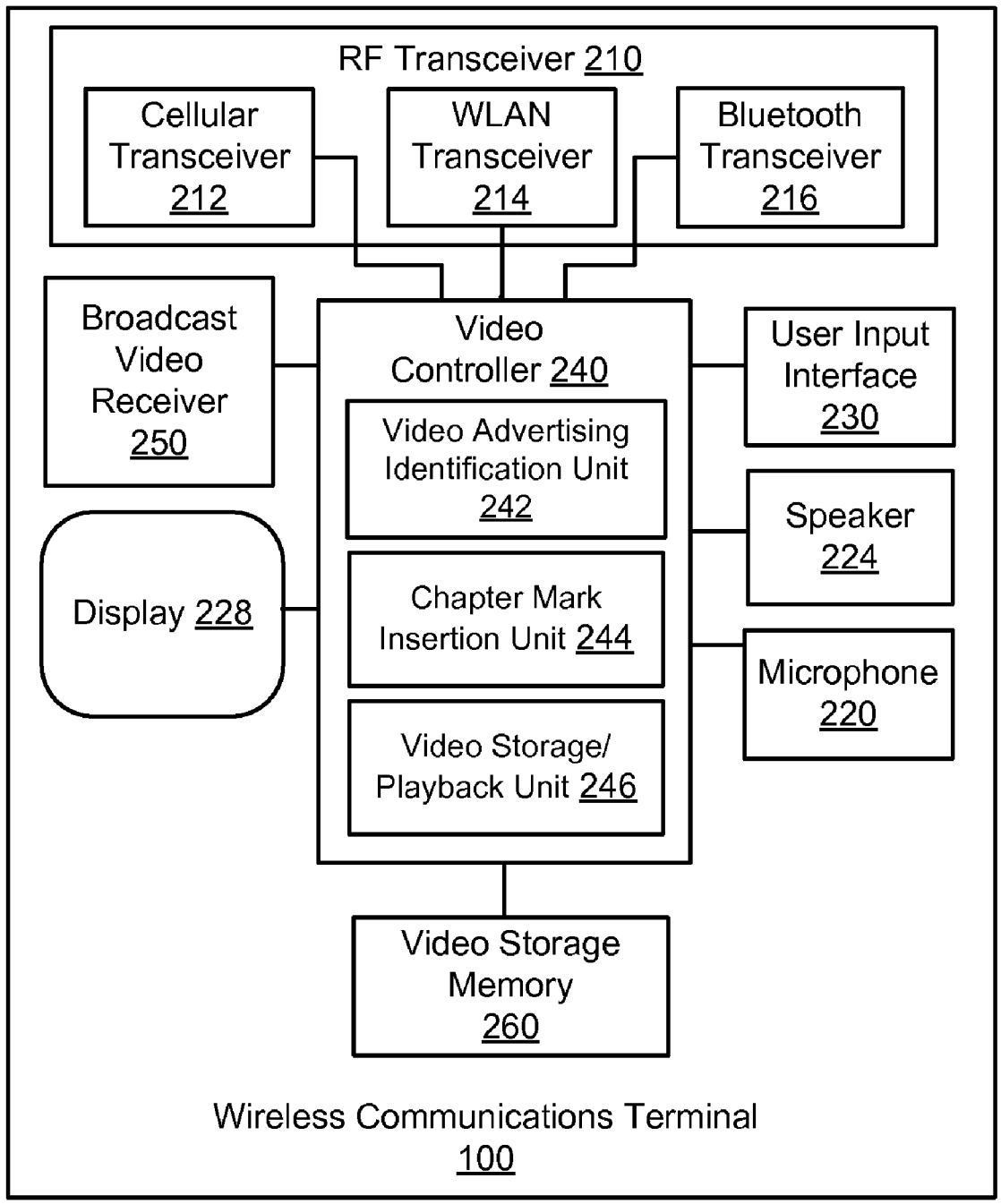
FIG. 2 is a block diagram of the mobile terminal of FIG. 1 in accordance with some embodiments of the present invention.

FIG. 2 is a block diagram of the mobile terminal 100 of FIG. 1 in accordance with some embodiments of the present invention. Referring to FIG. 2, the terminal 100 can include a wireless RF transceiver 210, a microphone 220, a speaker 224, a video display 228, a user input interface 230 (e.g., keypad/keyboard/touch interface/user selectable buttons), a video controller 240, a broadcast media receiver 250, and video storage memory 260.

It is to be understood that although the exemplary terminal 100 has been illustrated in FIG. 2 with various separately defined elements for ease of illustration and discussion, the invention is not limited thereto. Instead, various functionality described herein in separate functional elements may be combined within a single functional element and, vice versa, functionally described herein in single functional elements can be carried out by a plurality of separate functional elements.

The broadcast media receiver 250 is configured to receive broadcast program/movie video over the air from a terrestrial and/or satellite transmitter (e.g., transmitter 110 in FIG. 1) and may, for example, include a digital television receiver (e.g., high definition receiver-tuner).

The exemplary RF transceiver 210 can include a cellular transceiver 212, a WLAN transceiver 214 (e.g., compliant with one or more of the IEEE 801.11a-g standards), and/or a Bluetooth transceiver 216. The cellular transceiver 212 can communicate with the cellular transceiver 130 using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS) to receive a program/movie video stream from the media server 120.

The video controller 240 includes a video advertisement identification unit 242, a chapter mark insertion unit 244, and a video storage/playback unit 246. The storage/playback unit 246 is configured to provide digital video recorder functionality by storing a video stream received via the broadcast media receiver 250 and/or the RF transceiver 210 into the video storage memory 260, and by reading and playing back stored video onto the display 228. The video storage memory 260 can include a single memory device or a hierarchy of memory devices, such as nonvolatile semiconductor memory (e.g. flash memory) and/or a magnetic/optical disk drive.

Advertising content and program/movie content can alternately and repetitively occur in the received broadcast program/movie video stream. The advertising identification unit 242 is configured to identify the locations of the advertising content interspersed among the program/movie content in the received video stream. The chapter mark insertion unit 244 is configured to generate addressable chapter marks at locations that correspond to the identified locations of the advertising content. The chapter mark insertion unit 244 can cause the video storage module 246 to record the generated addressable chapter marks into the memory 260. As will be described further below, the chapter marks are referred to as being addressable because they serve to identify locations within a recorded video stream where playback can be jumped to cause playback therefrom.

The chapter mark insertion unit 244 can be configured to remove and replace each instance of the advertising content of the received video stream with a corresponding one of the addressable chapter marks to generate a modified video stream. The video storage/playback unit 246 can record the modified video stream into the memory 260. Alternatively or additionally, the chapter mark insertion unit 244 can insert the addressable chapter marks into the video stream at locations that are adjacent to an end/start location of each instance of the advertising content to generate the modified video stream. In some further embodiments, the chapter mark insertion unit 244 can insert the chapter marks into an address look-up table that is recorded within a same memory file in the memory 260 that contains the video stream.

In some further embodiments, the chapter mark insertion unit 244 is further configured to extract subtitle text that is embedded in the program/movie content portion of the received video stream and located within a defined play time and/or a defined number of words relative to each of the identified locations of advertising content. The extracted subtitle text may correspond to closed caption data content that is embedded within an audio portion of the video stream. The chapter mark insertion unit 244 can insert the extracted subtitle text as part of the addressable chapter marks that are recorded with the video stream into the memory 260.

In some further embodiments, the chapter mark insertion unit 244 is further configured to capture a snapshot of a video frame of the program/movie content portion of the video stream following each of the identified locations of the advertising content. The chapter mark insertion unit 244 can insert the capture snapshots as part of the addressable chapter marks that are recorded with the video stream into the memory 260.

In some further embodiments, the video storage/playback module 246 is configured to playback the recorded video stream, which was recorded into the memory 260, onto the video display 228. The video storage/playback module 246 is further configured to display on the display 228 a timeline that includes starting and ending indicia of the video stream and a present location indicia for a present location within the timeline between the starting and ending indicia, and to display on the timeline at least a plurality of the addressable chapter marks that are spaced apart by a distance that is proportional to their relative locations within the playback timeline of the video stream. An exemplary embodiment of a display configuration that may be used during playback of recorded video is shown in FIG. 3.

Figure 3:
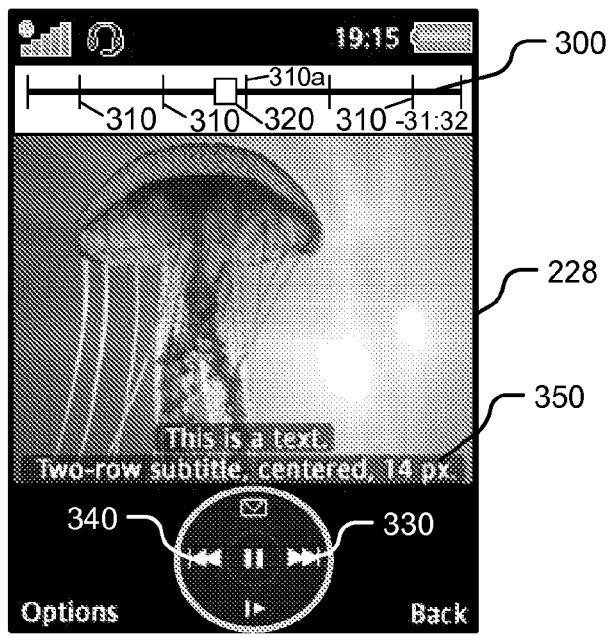
FIG. 3 illustrates the mobile terminal of FIG. 1 and shows the display of a recorded video playback timeline and chapter marks that are displayed relative to locations of identified advertising content in accordance with some embodiments of the present invention.

FIG. 3 shows exemplary graphics that may be displayed by the video storage/playback module 246 on the display 228 during playback of a video stream. The displayed graphics include a video playback timeline 300. The timeline 300 includes starting and ending indicia that can correspond to a starting point and an ending point of the video stream. As the playback progresses, a present location indicia 320 is moved along the timeline 300 to visually convey to a viewer how much of the video stream has been viewed and how much remains to be viewed.

Chapter marks 310 are displayed along the timeline 300 at locations that are defined relative to the identified advertising content in the video stream. For example, each chapter mark may be displayed at a location on timeline 300 that corresponds to an end location and/or start location of each instance of the advertising content in the received video stream. Each chapter mark may alternatively or additionally be displayed at a location on timeline 300 that corresponds to an end location and/or start location of each instance of the advertising content in the video stream that is read from the memory 260. The spacing between the chapter marks is therefore proportional to the relative locations of the identified advertising content within the playback timeline of the video stream.

The video storage/playback module 246 responds to a viewer's chapter selection signal, created by a viewer's actuation of the user input interface 230, by jumping the playback location within the video stream to locations defined by selected ones of the addressable chapter marks. For example, a viewer can repetitively select the right side 330 of the illustrated jog-dial to jump the video stream playback location forward in time to cause the playback of successively later occurring time locations defined by the sequentially ordered addressable chapter marks 310. Similarly, the viewer can repetitively select the left side 340 of the illustrated jog-dial to jump the video stream playback location backward in time to cause playback of successively earlier occurring time locations defined by the sequentially ordered addressable chapter marks 310.

The chapter mark insertion unit 244 can extract subtitle text that is embedded in the program/movie content portion of the video stream recorded in the memory 260 and located within a defined play time and/or within a defined number of words relative to a next occurring one of the displayed addressable chapter marks during receipt of a video and/or during playback of a recorded video. The video storage/playback module 246 can begin displaying the extracted subtitle text before playback reaches the next occurring displayed addressable chapter mark.

Thus, referring to the exemplary embodiment of FIG. 3, the chapter mark insertion unit 244 can extract the subtitle text 350 from a five second portion of the video stream and/or from ten words that occur immediately following the chapter mark 310a which will next be reached by the present location indicia 320 during playback. The video storage/playback module 246 can begin displaying the subtitle text 350 before the present location indicia 320 reaches the next occurring chapter mark 310a.

In this manner, a user who is viewing the video can read the extracted subtitle text 350 and determine whether the present playback location should be advanced forward to the next occurring chapter mark 310a, or to another subsequent chapter mark. Thus, for example, when the subtitle text 350 appears to correspond to an advertising portion of the video stream, the viewer can skip to the next chapter mark 310a by pressing the right side 330 of the jog-dial. Similarly, when the user is viewing an undesired advertisement and the subtitle text 350 appears to correspond to a desired program/movie portion of the video stream, the viewer can skip to the next chapter mark 310a to skip the remaining portion of the present and subsequent advertisements which occur before the chapter mark 310a.

Figure 4:
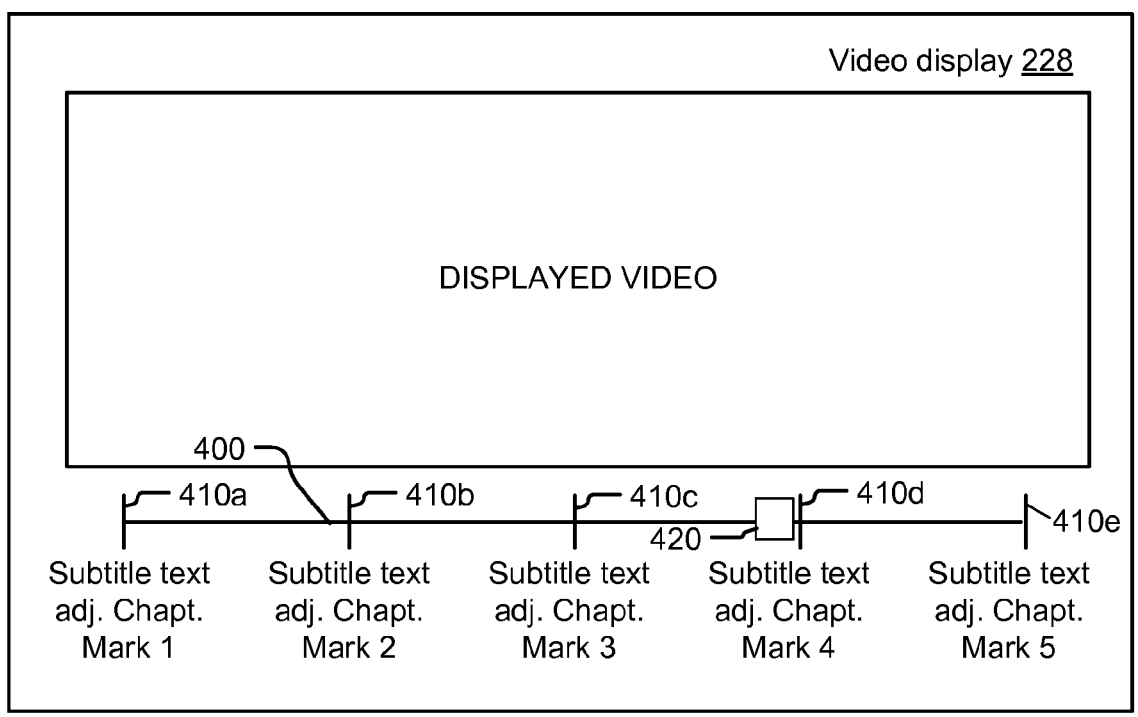
FIG. 4 illustrates the mobile terminal of FIG. 1 and shows the display of a recorded video playback timeline, chapter marks, and associated subtitle text that is extracted from the program/movie content adjacent to locations of identified advertising content in accordance with some embodiments of the present invention.

FIG. 4 illustrates another embodiment of the video display 228 and shows the graphics that may be displayed during playback of video frames thereon. Referring to FIG. 4, the displayed graphics include a video playback timeline 400, a plurality of chapter marks 410a-e, and a present location indicia 420. As described above, each of the chapter marks 410a-e can be displayed at a relative location along the timeline 400 of an end/start location of each instance of the identified advertising content of the video stream. In contrast to the display shown in FIG. 3, subtitle text that is extracted relative to a plurality of the displayed addressable chapter marks 410a-e is displayed on the display 228 adjacent to (e.g., below) each of the corresponding displayed addressable chapter marks 410a-e.

Thus, for example, the subtitle text that is extracted for a defined length of time and/or for a defined number of words immediately before and/or after the first chapter mark 410a is displayed below the first chapter mark 410a. Likewise, the subtitle text that is extracted for a defined length of time (e.g., 4 seconds) and/or for a defined number of words (e.g., 5 words) immediately before and/or after the second chapter mark 410b is displayed below the first chapter mark 410b. In this manner, the subtitle text extracted before and/or after the third through fifth chapter marks 410c-e is displayed below the respective third through fifth chapter mark 410c-e. Accordingly, a viewer who is viewing the video can read the extracted subtitle text associated with each of the chapter marks 410a-e, and can determine therefrom whether the viewer desires to jump the present playback location to a previous or forward occurring one of the chapter marks 410a-e.

Figure 5:
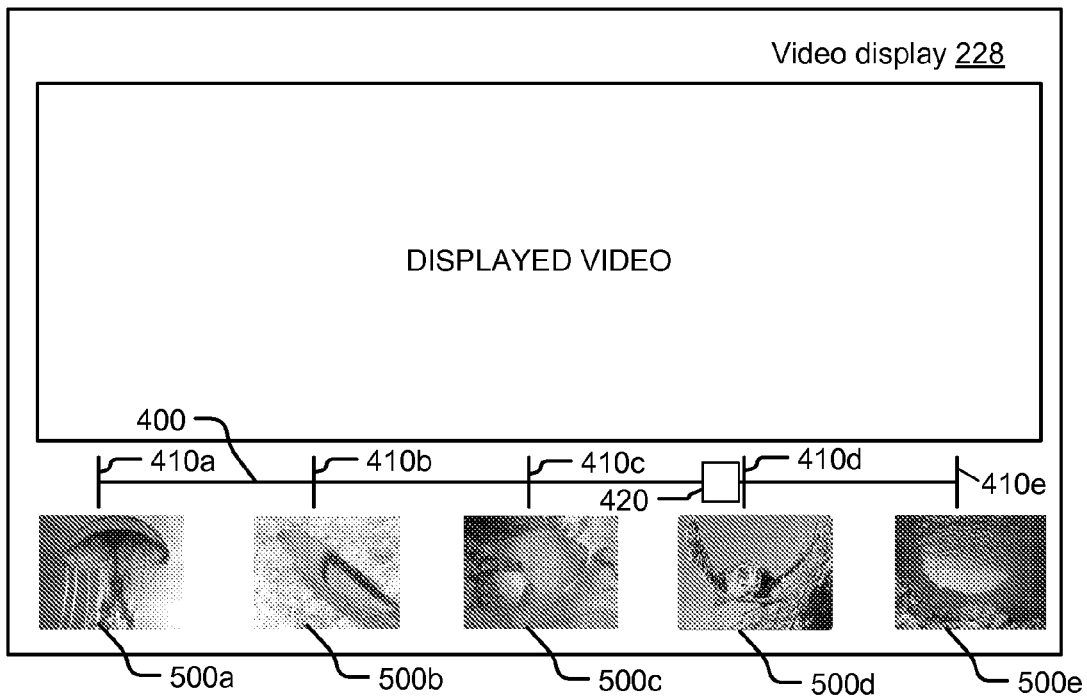
FIG. 5 illustrates the mobile terminal of FIG. 1 and shows the display of a recorded video playback timeline and chapter marks and associated video frame snapshots that are displayed relative to locations of identified advertising content in accordance with some embodiments of the present invention.

FIG. 5 illustrates another embodiment of the video display 228 and shows the graphics that may be displayed during playback of video frames thereon. Referring to FIG. 5, the displayed graphics include the video playback timeline 400, the plurality of chapter marks 410a-e, and the present location indicia 420 that were shown and described above with regard to FIG. 4. The graphics of FIG. 5 differ from those of FIG. 4 by the display in FIG. 5 of a snapshot of a video frame of the program/movie content portion of the video stream following each of the displayed addressable chapter marks 410a-e. The snapshots may be displayed on the display 228 adjacent to (e.g., below) each of the corresponding displayed addressable chapter marks 410a-e.

Thus, for example, a snapshot 500a of a video frame that occurs following the first chapter mark 410a is displayed below the first chapter mark 410a. Likewise, a snapshot 500b of a video frame that occurs following the second chapter mark 410b is displayed below the first chapter mark 410a. In this manner, snapshots 500c-e of video frames following the third through fifth chapter marks 410c-e are displayed below the respective third through fifth chapter mark 410c-e. Accordingly, a user who is viewing the video can visually observe the snapshot pictures 500a-e from a portion of the video following each of the displayed chapter marks 410a-e, and can determine therefrom whether the viewer desires to jump the present playback location to a previous or forwardly occurring one of the chapter marks 410a-e corresponding to one or more of the displayed snapshot pictures 500a-e.

In some other embodiments, which may be useful when the area of the display 228 is insufficient to adequately display the video stream and a plurality of the snapshots 500a-e (e.g., the smaller display of FIG. 3), the video storage/playback module 246 may display only one of the pictures 500a-e that corresponds to the next occurring displayed addressable chapter mark. Thus, in FIG. 5 the snapshot picture 500d would be displayed because it follows the next occurring chapter mark 410d adjacent to the present location indicia 420.

In some other embodiments, various ones of the snapshots 500a-e may be separately displayed as a user fast-forwards and/or rewinds the video playback past respective ones of the chapter marks 410a-e. Thus, for example, the snapshot 500b may be enlarged to fill the video display area when the user fast-forwards to within a defined distance of or crosses-over the chapter mark 410b.

In some other embodiments, the snapshots 500a-e may be repeating video clips having defined repetition times. Thus, for example, the video clip 500a may repetitively play five seconds of video leading-up-to and/or following-from the defined chapter mark 410a, with the other video clips 500b-e repetitively playing defined lengths of video associated in time with the respective chapter marks 410b-e.

Although an exemplary screen layout has been shown in FIG. 5, the invention is not limited thereto. For example, the snapshots 500a-e may be displayed in rows and columns forming a grid. Individual ones of the snapshots 500a-e may be separately enlarged (fish-eye enlargement) and displayed on an enlarged portion of a scrollbar and/or overlaid on a portion of the displayed video. The area of the display that is used to display the video may be reduced to make room for an enlarged display of one or more of the snapshots 500a-e.

In some other embodiments, the accuracy and/or speed at which the advertising identification unit 240 can identify locations of advertising content in a received video stream and/or in a video stream that is read from the memory 260, may be improved by searching within defined time windows. The time windows are defined around the expected times at which the instances of advertising content are expected to occur in the video stream. Exemplary operations of the advertising identification unit 240 are described below with regard to FIG. 6.

Figure 6:
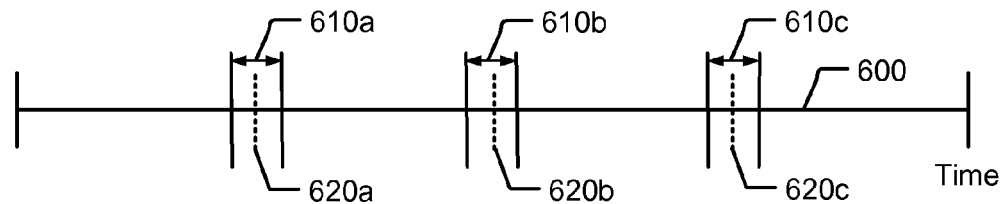
FIG. 6 illustrates a timeline of a video stream and associated time windows in which the mobile terminal searches for a location of advertising content in a received and/or recorded video streams in accordance with some embodiments of the present invention.

Referring to FIG. 6, a video timeline 600 is illustrated with a plurality of time windows 610a, 610b, and 610c which are overlaid thereon. The time windows 610a-c each correspond to where during the video stream the advertising content is expected to occur. Although advertising content may be expected to occur at periodically spaced intervals, such as every 15 minutes, the precise location of the beginning and/or end of the advertising content can vary over time because the broadcast service provider may shift the beginning of the advertisement content to correspond to the end of a naturally occurring scene change and/or at the end of a dialogue between actors in a scene in the program/movie. Accordingly, the width of the time windows 610a-c may be defined based on a level of uncertainty of where advertising content will begin and/or will end in the video stream.

For example, when advertising content is expected to occur at more precisely known periodic intervals, the width of the time windows 610a-c may be relatively small (e.g., a few seconds) around each one of the expected beginning/end locations 620a-c of the advertising content.

The advertising identification unit 242 may more quickly and accurately identify the beginning and/or end of each instance of the advertising content by searching within each of the time windows 610a-c to identify where a change of scene content occurs, with the change of scene content being defined as the beginning or end of the advertising content. The advertising identification unit 242 may, for example, identify a transition between program/movie content and advertising content in response to identifying a black video frame occurring within the time windows 610a-c, and/or in response to identifying a threshold amount of change between the content of a present video frame and the content of a previous video frame occurring within the time windows 610a-c (which may be measured at the output of a MPEG decoder which compares video frames to identify changed content).

Figure 7:
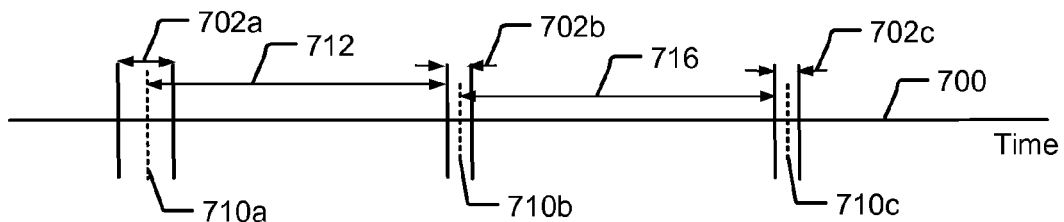
FIG. 7 illustrates another timeline of a video stream and associated time windows in which the mobile terminal searches for a location of advertising content in a received and/or recorded video stream, and in which the time windows are dynamically shifted in response to identifying location of one or more instances of the advertising content in accordance with some embodiments of the present invention.

In some further embodiments, the advertising identification unit 242 can dynamically shift the location of the time windows in which the searching is carried out to identify the advertising content. The advertising identification unit 242 may alternatively or additionally vary the width of the time windows in response to identifying a location of one or more instances of the advertising content in the video stream. Referring to FIG. 7, a timeline of a video stream is illustrated with a plurality of time windows 702a, 702b, and 702c. The advertising identification unit 242 can search within an initial wider time window 702a to identify a first instance of advertising content in the video stream at location 710a. In response to identifying the first instance at location 710a, the advertising identification unit 242 can then search for subsequent instances of the advertising content in subsequent time windows 702b and 702c.

The starting location of the second time window 702b can be determined as a defined time interval 712 from the identified location 710a of the first instance of the advertising content. The time window 702b can be narrower than the time window 702a because of the increased certainty with which the next instance 710b of advertising content in the video stream can be determined relative to the identified location 710a.

Similarly, the starting location of the subsequent time windows 702c can be determined as a defined time interval 716 from the identified location 710b of the advertising content identified within the time window 702b. The time window 702c may be narrower than the time window 702b because of the increased certainty of the location of the next instance 710c of advertising content in the video stream relative to the previously identified location 710b of the advertising content.

In some further embodiments, the advertising identification unit 242 can observe a viewer's behavior during playback of a video stream from the memory 260 to determine the location of the start/end of advertising content in the video stream. For example, when a viewer jumps to a chapter mark corresponding to the location 710b and then causes playback to reverse a defined distance before continuing the playback, the advertising identification unit 242 can determine from that behavior that the location of that chapter mark is incorrectly shifted to the right of the start of the program/movie content portion of the video stream, and can correct the chapter mark location by shifting it to the left about the defined distance to correspond to about where the viewer stopped the reversal to continue the playback of the video stream.

By way of further example, when a viewer jumps to a chapter mark corresponding to the location 710b and then causes playback to fast-forward a defined distance before continuing normal speed playback, the advertising identification unit 242 can determine from that behavior that the location of that chapter mark is incorrectly shifted to the left of the start of the program/movie content portion of video stream, and can correct the chapter mark location by shifting it to the right about the defined distance to correspond to about where the viewer stopped the fast-forward to continue the normal speed playback of the video stream.

In some further embodiments, the video controller 240 is configured to share the identified chapter mark locations with another communication device, such as with the wireless communication terminal 160 shown in FIG. 1. The video controller 240 may further share the extracted subtitle text and/or the snapshot pictures associated with the chapter mark locations with the other communication device. For example, the video controller 240 may generate a message that includes an identifier that identifies the video stream (e.g., name of the TV show and episode and/or name of a movie), the addressable chapter marks, the extracted subtitle text and/or the snapshot pictures associated with the chapter marks. Video controller 240 can transmit the generated message through the RF transceiver 210 to the other terminal 160 via the cellular base station transceiver 130 and/or the WLAN/Bluetooth network 150.

Alternatively or additionally, the video controller 240 can store the identified chapter mark locations and associated information (snapshot images, subtitle text, etc.) in a centralized network database, such as in an Internet accessible database repository, where they can be retrieved and used by other communication devices. The Internet database may include, for example, the Internet Movie Database (IMDb) and/or the Grace-Note database. The information in the network database may be compiled through an accumulation of submissions from a plurality of different communication device users, such as from users who have automatically (as described above) and/or manually generated chapter marks and associated information. Chapter marks that have been submitted by one user may be edited, deleted, and/or added-to by submissions from another user.

Consequently, once the chapter marks and associated information have been defined for a particular video stream (i.e., a particular TV show or movie), they may be shared with other communication devices which can use them during playback of that video stream recorded thereon.

As will be appreciated by one of skill in the art, the present invention may be embodied as apparatus (terminals, servers, systems), methods, and computer program products. Accordingly, the present invention may take the form of an entirely hardware embodiment, a software embodiment or an embodiment combining software and hardware aspects all generally referred to herein as a "circuit" or "module." It will be understood that each block of the flowchart illustrations and/or block diagrams, and combinations of blocks in the flowchart illustrations and/or block diagrams, described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can be recorded on a computer-readable storage medium, such as on hard disks, CD-ROMs, optical storage devices, or integrated circuit memory devices. These computer program instructions on the computer-readable storage medium direct a computer or other programmable data processing apparatus to function in a particular manner, such that the instructions stored in the computer-readable storage medium when executed by a processor produce an article of manufacture including instruction means which implement the function/act specified in the flowchart and/or block diagram block or blocks.

The computer program instructions may also be loaded onto and executed by a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An electronic device comprising:
   video storage memory;
   a video signal receiver that is configured to receive from a broadcast source a video stream containing advertising content and program/movie content; and
   a video storage controller that is configured to identify locations of advertising content interspersed among program/movie content in the received video stream, and to record addressable chapter marks indicating the identified locations of the advertising content in the received video stream to produce a modified video stream that includes the addressable chapter marks, into the memory,
   wherein the video storage controller is further configured to insert graphics corresponding to content that is embedded in the program/movie content portion of the received video stream as part of the addressable chapter marks within the modified video stream, and to begin displaying a respective one of the graphics for a next occurring addressable chapter mark within the modified video stream during and within playback of the modified video stream before the playback reaches that next occurring addressable chapter mark.

2. The electronic device of claim 1, wherein the video storage controller is further configured to insert the addressable chapter marks within an address look-up table that is recorded within a same memory file that contains the modified video stream.

3. The electronic device of claim 1, wherein the video storage controller is further configured to remove and replace each instance of the advertising content of the received video stream with a corresponding one of the addressable chapter marks to generate the modified video stream that is recorded into the memory.

4. The electronic device of claim 1, wherein the video storage controller is further configured to extract subtitle text that is embedded in the program/movie content portion of the received video stream and located within a defined play time relative to each of the identified locations of advertising content, and to insert the extracted subtitle text as part of the addressable chapter marks that are recorded with the modified video stream into the memory.

5. The electronic device of claim 4, wherein the video storage controller is further configured to begin displaying on a display the extracted subtitle text for the next occurring addressable chapter mark during the playback of the modified video stream before the playback reaches that next occurring addressable chapter mark.

6. The electronic device of claim 1, wherein the video storage controller is further configured to capture a snapshot of a video frame of the program/movie content portion of the received video stream following each of the identified locations of the advertising content, and to insert the captured snapshots as part of the addressable chapter marks that are recorded with the modified video stream into the memory.

7. The electronic device of claim 6, wherein the video storage controller is further configured to begin displaying on a display the captured snapshot for the next occurring addressable chapter mark during the playback of the modified video stream before the playback reaches that next occurring addressable chapter mark.

8. The electronic device of claim 1, wherein the video storage controller is further configured to playback the modified video stream, which was recorded into the memory, onto a video display, to display on the display a playback timeline that indicates a playback length of the modified video stream and includes an indicia that indicates a present playback location within the playback timeline, and to display on the playback timeline at least a plurality of the addressable chapter marks having spacing therebetween that is proportional to their relative locations within the playback timeline of the modified video stream.

9. The electronic device of claim 8, wherein the video storage controller is further configured to respond to a viewer chapter selection signal by jumping a playback location within the modified video stream to locations defined by selected ones of the addressable chapter marks.

10. The electronic device of claim 9, wherein the video storage controller is further configured to respond to each occurrence of the viewer chapter selection signal by jumping the playback location to a different one of sequentially occurring time locations in the modified video stream defined by sequential ordered ones of the addressable chapter marks.

11. The electronic device of claim 9, wherein the video storage controller is further configured to extract subtitle text that is embedded in the program/movie content portion of the modified video stream recorded in the memory and located within a defined play time relative to the next playback occurring one of the displayed addressable chapter marks, and to begin displaying the extracted subtitle text before the playback reaches that next occurring displayed addressable chapter mark.

12. The electronic device of claim 11, wherein the subtitle text comprises closed captioned text that is embedded in the program/movie content portion of the modified video stream recorded in the memory, and the video storage controller is further configured to extract and display on the video display a defined number of words of the closed captioned text that occur prior to the next playback occurring one of the displayed addressable chapter marks.

13. The electronic device of claim 9, wherein the video storage controller is further configured to extract subtitle text that is embedded in the program/movie content portion of the modified video stream recorded in the memory and located within a defined play time relative to a plurality of the displayed addressable chapter marks, and to display on the display the extracted subtitle text for the plurality of the displayed addressable chapter marks.

14. The electronic device of claim 13, wherein the video storage controller is further configured to display the extracted subtitle text associated with a plurality of the displayed addressable chapter marks ordered on the display adjacent to those displayed addressable chapter marks.

15. The electronic device of claim 13, wherein the extracted subtitle text comprises closed captioned text that is embedded in the modified video stream recorded in the memory, and the video storage controller is further configured to extract and display on the video display a defined number of words of the closed captioned text that occur following a plurality of the displayed addressable chapter marks.

16. The electronic device of claim 9, wherein the video storage controller is further configured to capture a snapshot of a video frame of the program/movie content portion of the received video stream following the next playback occurring one of the displayed addressable chapter marks, and to begin displaying the captured snapshot before the playback reaches that next occurring displayed addressable chapter mark.

17. The electronic device of claim 9, wherein the video storage controller is further configured to capture a snapshot of a video frame of the program/movie content portion of the received video stream following each of the displayed addressable chapter marks, and to display on the video display the captured snapshots for the plurality of the displayed addressable chapter marks.

18. The electronic device of claim 1, wherein the video storage controller is further configured to identify the location of each instance of the advertising content in the received video stream in response a threshold amount of change of scene content occurring between two sequential frames of the received video stream during a time window defined around an expected time of occurrence of each instance of the advertising content.

19. The electronic device of claim 18, wherein the video storage controller is further configured to identify the location of a first instance of the advertising content and to then determine a start location of a subsequent time window, which it will use to search for a second instance of the advertising content, as a defined time interval away from the identified location of the first instance of the advertising content.

20. The electronic device of claim 1, wherein the video storage controller is further configured to generate a message including an identifier for the modified video stream and the associated addressable chapter marks, and to transmit the message through an external network to another electronic device for use in displaying the modified video stream with the addressable chapter marks.

* * * * *